United States Patent Office 3,544,665
Patented Dec. 1, 1970

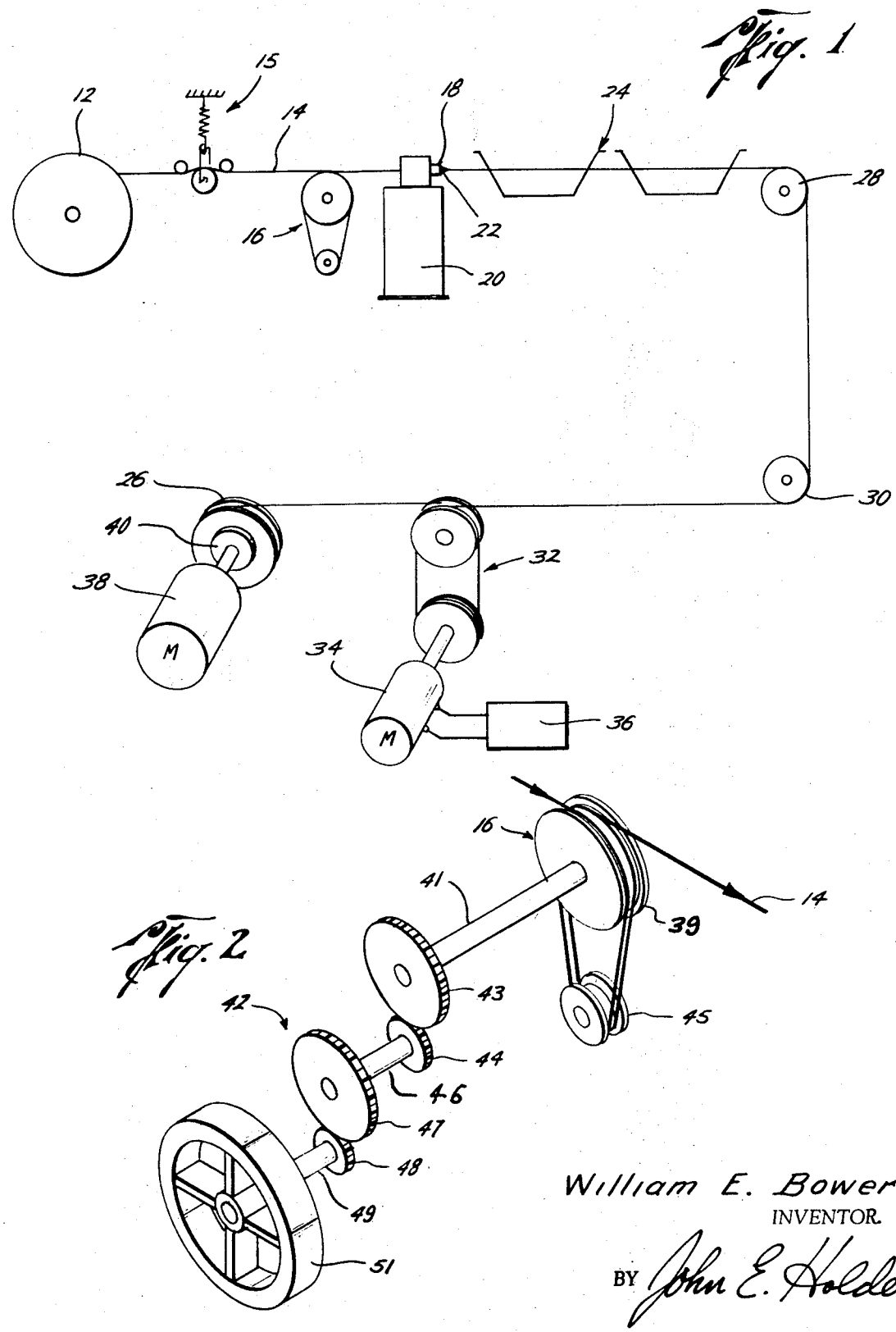

3,544,665
METHOD AND APPARATUS FOR MANUFACTURING ELECTRICAL CONDUCTORS
William E. Bowers, Houston, Tex., assignor to Schlumberger Technology Corporation, Houston, Tex., a corporation of Texas
Continuation of application Ser. No. 548,294, May 6, 1966. This application Jan. 24, 1969, Ser. No. 797,352
Int. Cl. B29f 3/10; B29h 5/28; B65h 25/04
U.S. Cl. 264—40                                        5 Claims

ABSTRACT OF THE DISCLOSURE

The technical disclosure describes methods and apparatus for manufacturing insulated electrical conductor wiring. The wire to be insulated is payed out at a substantially constant average speed from a supply spool. Variable tensioning means is utilized to eliminate any slack in the wire. The wire is then coupled through a system of gears to a flywheel possessing a large moment of inertia. This wheel serves as a passive speed stabilization device to stabilize the instantaneous speed of the wire just prior to its passage through an extrusion die. The wire is then passed through the extrusion die and the insulation material extruded thereon. From the extrusion die, the wire passes through a cooling or curing trough and, finally, is taken up on a storage spool.

---

This application is a continuation of Ser. No. 548,294, filed May 6, 1966, now abandoned.

This invention relates to methods and apparatus for manufacturing electrical conductors and, more particularly, to methods and apparatus for applying a uniform insulating material to a conductor.

In the manufacture of insulated electrical conductors, it is usually important to maintain a uniform thickness of the insulating material being applied to the conductor wire and thereby produce a uniform diameter of insulated wire.

The insulation thickness on conductors has a two-fold effect. First, the insulation effects the capacitance between conductors in a cable. This is of primary concern where a thin layer of insulation is used. In applications requiring a large thickness of insulation, variations therein are reflected in the physical configuration of subsequent layers of material applied to the conductors, such as armor. Both the electrical and mechanical effects of nonuniform insulation are critical in the manufacture of electrical cables.

If the insulation is applied to the wire by means of an apparatus which extrudes a molten material onto the wire, one parameter which significantly affects the thickness of material applied to the wire is the speed of the conductor as its passes through the extruder. Therefore, if a uniform diameter of coated wire is to be maintained, it is necessary that the motion of the wire through the extruder be extremely uniform.

Present systems for applying insulating material to wire generally include a wire pay-out, tension control device, and take-up mechanism with an extruder or the like positioned between the tension control and take-up for applying the insulating material to the wire. Elaborate speed control devices are used on the take-up capstan in an attempt to maintain a uniform conductor speed through the extruder. The tension control device attempts to compensate for uneven forces necessary to unreel wire from the pay-out.

The take-up capstan is normally spaced a relatively great distance from the extruder. This is because it is usually necessary to have long cooling troughs or the like between the extruder and take-up capstan to cure the insulating material before it passes over the take-up capstan. Due to the elastic nature of the conductor wire, the long span through the curing process, and the nonuniform effort required to unwind the supply spool, the present system is inadequate. Although the take-up capstan may be moved at an extremely uniform speed, commonly wide variations in the resistance to unwinding of wire from the supply spool causes variations in the sag and stretch of the conductor which, in turn, results in a nonuniform motion of the conductor at the point it leaves the extruder. Since the insulating material is applied at the point the wire leaves the extruder, these pulsations of speed are reflected by corresponding variations in the insulation diameter. Such speed fluctuations of the wire might be minimized if the take-up capstan could be located very close to the extruder. However, the use of long cooling troughs, or the like, for curing the insulating material prevents such a positioning of the take-up capstan.

The wide tension variations that occur at the supply spool can be somewhat reduced by the use of various tension control systems such as a spring-loaded pulley. While such systems reduce the speed fluctuation problem, they do not provide the degree of control that is desirable in the precise application of insulating material to conductors.

It is, therefore, an object of the present invention to provide a new and improved system for applying an insulating material to a wire wherein the wire speed is stabilized as it passes through the apparatus applying the insulating material.

With this and other objects in view, the present invention contemplates a capstan, located near the input to an extruder, for stabilizing the speed of wire as it passes through the extruder. More particularly, the capstan is coupled by means of a gear train to a weighted member which serves as a fly wheel. The action of the fly wheel is multiplied by the gear train to apply a large amount of inertia to the capstan and, therefore, to the wire at a point very close to the point of application of insulating material to the wire. Because the inertia of the wire at this point is large, the variations in drag on the conductor will not significantly change the speed of the conductor as it passes through the extruder. Further, since the stabilizing device is located very near the extruder, there is not sufficient length of the conductor from the stabilizing point to the exit die of the extruder to permit the conductor to stretch sufficiently to cause noticeable speed variations.

The novel features of the present invention are set forth with particularity in the appended claims. The present invention, both as to its organization and manner of operation, together with further objects and advantages thereof may best be understood by illustration and example of a certain embodiment when taken in conjunction with the accompanying drawings in which:

FIG. 1 is a schematic representation of a wire insulating process including the wire speed stabilizing system embodying the present invention; and FIG. 2 is a perspective view of an apparatus for stabilizing wire speed.

Referring first to FIG. 1 of the drawings, a system utilizing the present invention is shown including a pay-off spool or drum 12 for providing a supply of wire 14 to be insulated. The wire passes from the pay-off spool around a first capstan 16 which forms a part of the wire speed stabilizing mechanism. A tensioning device 15 is positioned between the pay-out spool 12 and capstan 16 to prevent wire which is scramble-wound on the spool from accelerating and breaking. The tensioning device 15 may be of any type which will take up sudden slack in the wire and thereby dampen accelerations of the wire as it leaves the spool. The tensioning device, however, is inadequate in completely reducing changes in speed and contrarywise prevents the inertia of the pay-out spool from having a stabilizing effect on the wire speed. From the capstan 16, the wire passes through an extrusion head or die 18 on an extruder 20. Insulating material 22, in a molten form, is extruded about the wire 14 as it passes through the extrusion head.

After application of insulating material to the wire, the wire is moved through cooling troughs 24 having water or other coolant flowing therethrough for hardening the insulating material on the wire before the wire is taken up on a reel 26. Of course, the hardening or curing may be performed by other methods such as continuous vulcanization where rubber is the insulating material being applied.

Sheaves or pulleys 28 and 30 are provided to direct the wire to the take-up reel. A second capstan 32 is positioned between the cooling troughs and the take-up reel to pull the wire through the process and provide speed control to the system. The second capstan is driven by a drive motor 34 having a variable speed control 36 to selectively regulate the speed of the wire and thus the diameter of insulation applied to the wire. The take-up reel 26 is driven by a separate variable speed motor 38 with the motor being coupled to the take-up reel by means of a slip clutch 40. The motor 38 drives the take-up at a speed slightly greater than the speed of the capstan 32 with the clutch 40 compensating for the differences in speed.

Although the second capstan 32 is moved with extremely uniform speed, the length of the conductor wire between the extruder and the take-up capstan permits variations in the drag resistance of the wire to stretch and recoil the wire as it passes through the extruder thereby resulting in a nonuniform motion of the conductor at the point it leaves the extruder. The nonuniform motion of the wire is also aggrevated by the variations in the tension of wire leaving the pay-out reel 12. This overall problem is overcome by the use of the wire speed stabilizer capstan 16 which is positioned between the pay-off spool 12 and the extruder die 18.

Referring to FIG. 2, the wire speed stabilizer capstan is shown having a pair of rubber-lined wheels 39, 45 with wheel 39 mounted on a shaft 41. (A support for the capstan 16 is not shown.) Shaft 41 is coupled to a gear train 42 comprised of toothed spur gears. The gear train includes a first driving gear 43 mounted on shaft 41. A first pinion gear 44 is meshed with gear 43 and is mounted on a shaft 46. A second driving gear 47 is also mounted on shaft 46 and is meshed with a second pinion gear 48. Pinion gear 48, in turn, is mounted on shaft 49 which supports a large fly wheel 51. The purpose of this pay-out capstan with the associated gear train and fly wheel is to provide a large amount of inertia to wire 14 at a point very near the extruder head. The influence of the massive disk or fly wheel 51 in supplying inertia to the wire 14 is multiplied several times by the gear train 42. Because the inertia of the system is large, the speed variations and drag on the conductor will not significantly change the speed of the conductor as it passes through the extruder head.

Further, since this pay-out capstan is located very close to the extruder head, there is not sufficient distance between the capstan 16 and the extruder head 18 to permit the conductor or wire 14 to stretch significantly and cause noticeable speed variations.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

I claim:

1. Apparatus for use in applying a coating of uniform thickness to a wire being passed between a payout means and a takeup means comprising:

first speed control means including a primary speed control capstan for maintaining a substantially constant average speed of said wire as it passes between said payout means and said takeup means;

applicator means positioned between said payout means and said takeup means for applying a coating or fluid material about said wire;

an elongated receptacle between said applicator means and said takeup means and through which said wire is passed to enable curing of said material;

second speed control means separate from said first speed control means and positioned in advance of and near the input of said applicator means for maintaining a subtantially constant instantaneous speed of said wire at said applicator means, said second speed control means including a mass moving at a substantially constant speed, the inertia of said mass functioning to maintain a substantially constant instantaneous speed in the portion of the wire passing through said applicator by opposing the tendency of any sudden changes in tension in the wire to accelerate said portion; and means including a rotatably mounted capstan about which said wire is passed in frictional engagement therewith for coupling said moving mass to said wire.

2. The apparatus of claim 1 wherein said coupling means further includes a gear train for multiplying the effective inertia of said moving mass, said applicator means including means for extruding a fluid insulating material about said wire.

3. Apparatus for use in applying a coating of uniform thickness to a wire comprising:

wire payout means and takeup means longitudinally spaced from one another;

material applicator means positioned between said payout means and said takeup means for applying a coating of fluid material about said wire;

curing receptacle means positioned between said applicator means and said takeup means and adapted to receive said wire upon its exit from said applicator means;

first speed control means including a primary speed control capstan for maintaining a substantially constant average speed of said wire between said payout means and said takeup means;

second speed control means positioned near the input of said applicator means and between said applicator means and said payout means for maintaining a substantially constant instantaneous speed of said wire at said applicator means and for damping out perturbations of the average speed of said wire as it passes through said applicator means, said second speed control means including a moving mass providing a substantially contstant source of angular momentum and frictionally coupled to said wire by a rotatably mounted capstan.

4. The apparatus of claim 5 wherein said first speed control means includes a variable tensioning means positioned between said payout means and said second speed control means for maintaining substantially constant average tension in said wire as it is payed off.

5. A method for applying a uniform thickness of insulation or the like to a wire, comprising the steps of: passing a wire at a substantially constant average speed between a payout means and a takeup means; applying a fluent insulting material to the wire at a location between the payout means and the takeup means, the thickness of the insulating material about the wire being a function of the instantaneous speed of movement of the wire at the location where the insulation is applied; and controlling the instantaneous speed of movement of the wire at the location where the insulation is applied by frictionally coupling the wire to a rotatably mounted capstan that is mechanically coupled to a moving mass that provides a source of substantially constant angular momentum said capstan being located near the applicator location, said controlling step serving to stabilize the instantaneous speed of movement of the wire at the location where the insulation is applied to obtain uniform thickness of the material about the wire.

References Cited

UNITED STATES PATENTS

| | | | |
|---|---|---|---|
| 2,069,087 | 1/1937 | Forstorm et al. | 264—174 |
| 2,267,107 | 12/1941 | Juillard | 242—75.3 |
| 2,372,810 | 4/1945 | Camras | 242—47.09 |
| 3,155,750 | 11/1964 | Dahn et al. | 264—40 |

ROBERT F. WHITE, Primary Examiner

J. R. THURLOW, Assistant Examiner

U.S. Cl. X.R.

264—174; 18—66, 13; 242—47.08, 75.3